(12) United States Patent
Stiles

(10) Patent No.: US 10,954,639 B2
(45) Date of Patent: *Mar. 23, 2021

(54) ONE PIECE WATER PERMEABLE PAVER

(71) Applicant: Airlite Plastics Co., Omaha, NE (US)

(72) Inventor: Barry J. Stiles, Houston, TX (US)

(73) Assignee: Airlite Plastics Co., Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/290,011

(22) Filed: Mar. 1, 2019

(65) Prior Publication Data
US 2019/0194885 A1 Jun. 27, 2019

Related U.S. Application Data

(63) Continuation of application No. 15/255,853, filed on Sep. 2, 2016, now Pat. No. 9,617,698.

(51) Int. Cl.
*E01C 17/00* (2006.01)
*F21S 8/02* (2006.01)
*F21S 9/02* (2006.01)
*E01C 5/20* (2006.01)
*E01C 9/00* (2006.01)
(Continued)

(52) U.S. Cl.
CPC ............... *E01F 9/559* (2016.02); *E01C 5/20* (2013.01); *E01C 9/004* (2013.01); *E01C 17/00* (2013.01); *F21S 2/00* (2013.01); *F21S 8/022* (2013.01); *F21S 9/02* (2013.01); *H05B 47/155* (2020.01); *H05B 47/175* (2020.01); *F21V 15/01* (2013.01); *F21V 23/0407* (2013.01);
(Continued)

(58) Field of Classification Search
CPC ..... E01F 9/559; E01F 9/20; E01F 9/30; E01F 9/40; E01C 5/00; E01C 17/00; E01C 11/00; E01C 3/00; E01C 2201/06; E01C 9/00; F21S 8/022; F21S 9/02; F21S 15/01; F21S 2/00; F21V 23/0407; F21V 15/01; H05B 37/029; H02S 20/21; Y02A 30/30
USPC ............................... 52/223.7; 404/27–41, 16
See application file for complete search history.

(56) References Cited

U.S. PATENT DOCUMENTS 1,981,206 A 11/1934 Strauss
3,310,906 A 3/1967 Glukes
(Continued)

OTHER PUBLICATIONS

Dec. 2, 2016—U.S. Notice of Allowance—U.S. Appl. No. 15/255,853.
(Continued)

*Primary Examiner* — Abigail A Risic
(74) *Attorney, Agent, or Firm* — Banner & Witcoff, Ltd.

(57) ABSTRACT

A one piece water permeable paver for forming a surface suitable for traffic having outer flex joint connection cells connected to connectors, outer three connection cells connected to one of the outer flex joint connection cells, outer two connection cells connected to two outer three connection cells, a plurality of inner single flex joint connection cells connected to one of the connectors, and an inner dual flex joint connection cell engaging two connectors, inner four connection cells connected to a pair of outer three connection cells and a pair of inner single flex joint connection cells. Fastening slots are formed partially through outer surfaces of cells that form two sides of the paver. Locking tabs extend from outer surfaces of cells forming two sides of the paver opposite the sides with the locking tabs, enabling a first paver to securely interlock to an adjacent paver.

20 Claims, 6 Drawing Sheets

(51) Int. Cl.
*F21S 2/00* (2016.01)
*F21V 15/01* (2006.01)
*E01F 9/559* (2016.01)
*H05B 47/155* (2020.01)
*H05B 47/175* (2020.01)
*F21V 23/04* (2006.01)
*F21W 111/02* (2006.01)
*F21Y 115/10* (2016.01)

(52) U.S. Cl.
CPC ....... *F21W 2111/02* (2013.01); *F21Y 2115/10* (2016.08); *Y02A 30/30* (2018.01)

(56) References Cited

U.S. PATENT DOCUMENTS

| | | | |
|---|---|---|---|
| 3,909,996 A | 10/1975 | Ettlinger, Jr. et al. | |
| 4,111,585 A | 9/1978 | Mascaro | |
| 4,440,818 A | 4/1984 | Buchan et al. | |
| 4,749,302 A | 6/1988 | DeClute | |
| 4,826,351 A | 5/1989 | Haberhauer et al. | |
| 5,250,340 A * | 10/1993 | Bohnhoff | E01C 9/004 |
| | | | 428/99 |
| 5,406,745 A | 4/1995 | Lin | |
| 5,411,782 A * | 5/1995 | Jarvis | E04H 4/08 |
| | | | 160/229.1 |
| 5,507,600 A * | 4/1996 | Takahashi | E02D 29/12 |
| | | | 404/14 |
| 5,527,128 A * | 6/1996 | Rope | E01C 5/20 |
| | | | 404/35 |
| 5,628,160 A | 5/1997 | Kung | |
| 5,848,856 A * | 12/1998 | Bohnhoff | E02B 11/00 |
| | | | 405/36 |
| 5,992,106 A | 11/1999 | Carling et al. | |
| 6,027,280 A | 2/2000 | Conners et al. | |
| 6,082,886 A | 7/2000 | Stanford | |
| 6,089,784 A | 7/2000 | Ardem | |
| 6,301,842 B1 | 10/2001 | Chaney et al. | |
| 6,451,400 B1 * | 9/2002 | Brock | A47L 23/24 |
| | | | 15/161 |
| 6,622,440 B2 | 9/2003 | Mercade | |
| 6,755,550 B1 | 6/2004 | Lackey | |
| 7,070,294 B2 * | 7/2006 | Patti | E01C 17/00 |
| | | | 362/153.1 |
| 7,114,298 B2 * | 10/2006 | Kotler | E01C 5/20 |
| | | | 52/177 |
| 7,210,538 B2 | 5/2007 | Gust et al. | |
| 7,210,876 B2 * | 5/2007 | Moralez | E01C 9/004 |
| | | | 404/36 |
| 7,571,572 B2 * | 8/2009 | Moller, Jr. | E01C 5/20 |
| | | | 404/41 |
| 7,815,395 B1 * | 10/2010 | Blackwood | E03F 1/002 |
| | | | 405/43 |
| 7,950,191 B2 | 5/2011 | Brouwers | |
| 8,235,542 B2 | 8/2012 | Yohananoff | |
| 8,464,490 B2 * | 6/2013 | Rapaz | E04C 2/20 |
| | | | 52/592.1 |
| 8,734,049 B1 * | 5/2014 | Stiles | E01C 11/24 |
| | | | 404/36 |
| 9,169,607 B2 * | 10/2015 | Schweizer | F21V 33/006 |
| 9,540,811 B2 * | 1/2017 | Rapaz | E04C 2/34 |
| 9,617,698 B1 * | 4/2017 | Stiles | E01F 9/559 |
| 9,670,624 B1 * | 6/2017 | Stiles | E01F 9/553 |
| D792,987 S * | 7/2017 | Stiles | D25/155 |
| 2005/0193669 A1 * | 9/2005 | Jenkins | E01C 5/20 |
| | | | 52/392 |
| 2006/0263146 A1 | 11/2006 | Moralez et al. | |
| 2008/0052986 A1 | 3/2008 | Son et al. | |
| 2008/0072514 A1 | 3/2008 | Barlow | |
| 2008/0272278 A1 | 11/2008 | Shewa et al. | |
| 2009/0031658 A1 * | 2/2009 | Moller, Jr. | E01C 5/20 |
| | | | 52/403.1 |
| 2010/0109189 A1 * | 5/2010 | Brouwers | E01C 5/20 |
| | | | 264/239 |
| 2011/0013384 A1 | 1/2011 | Lu | |
| 2012/0110933 A1 * | 5/2012 | Beretta | E01C 5/20 |
| | | | 52/177 |
| 2012/0163911 A1 | 6/2012 | Culleton et al. | |
| 2013/0287493 A1 * | 10/2013 | Rusch | E01C 9/004 |
| | | | 404/13 |
| 2014/0270945 A1 | 9/2014 | Bach et al. | |
| 2016/0301355 A1 * | 10/2016 | Small | H02S 20/21 |
| 2018/0030666 A1 * | 2/2018 | Penland, Jr. | E01C 9/086 |
| 2018/0030667 A1 * | 2/2018 | Penland, Jr. | E01C 5/18 |

OTHER PUBLICATIONS

Feb. 14, 2017—U.S. Notice of Allowance—U.S. Appl. No. 15/360,174.
Sep. 12, 2017—WO International Search Report—PCT/US2017/038557.
Sep. 12, 2017—WO Written Opinion—PCT/US2017/38557.

* cited by examiner

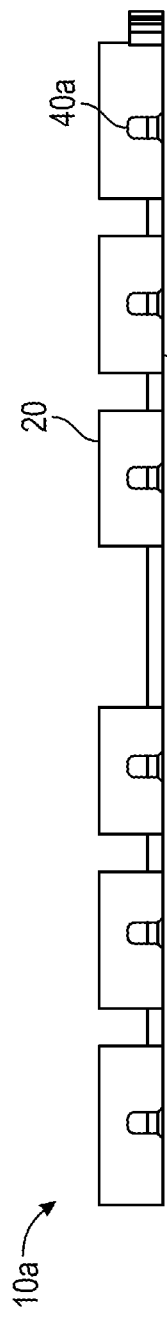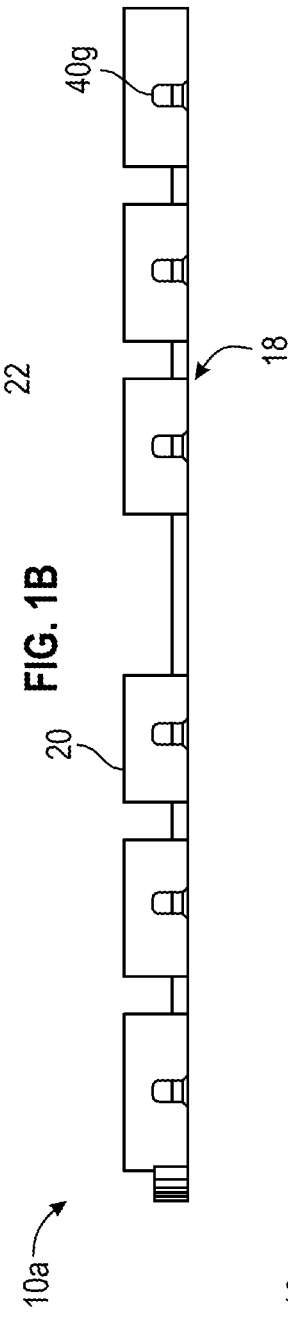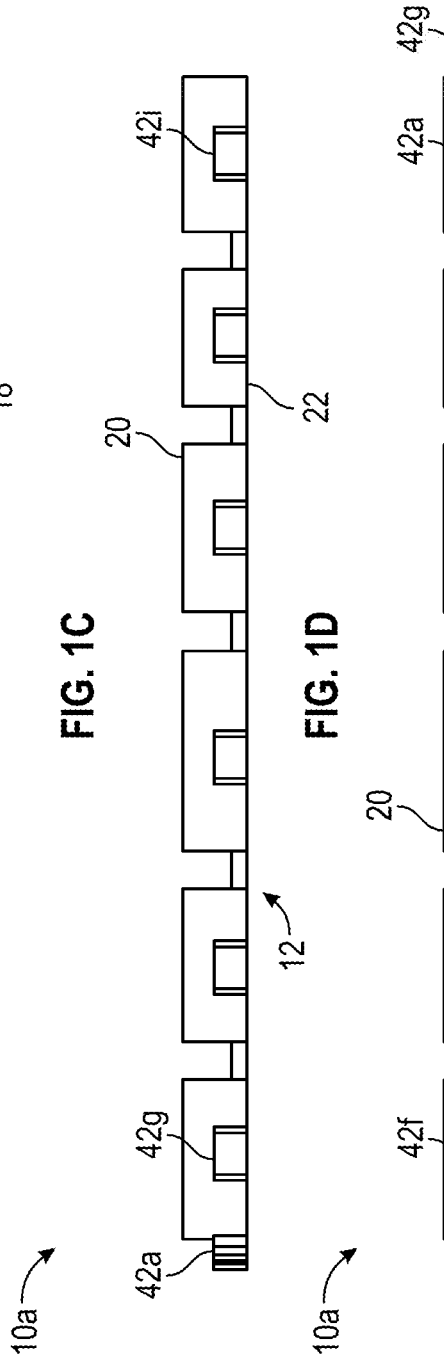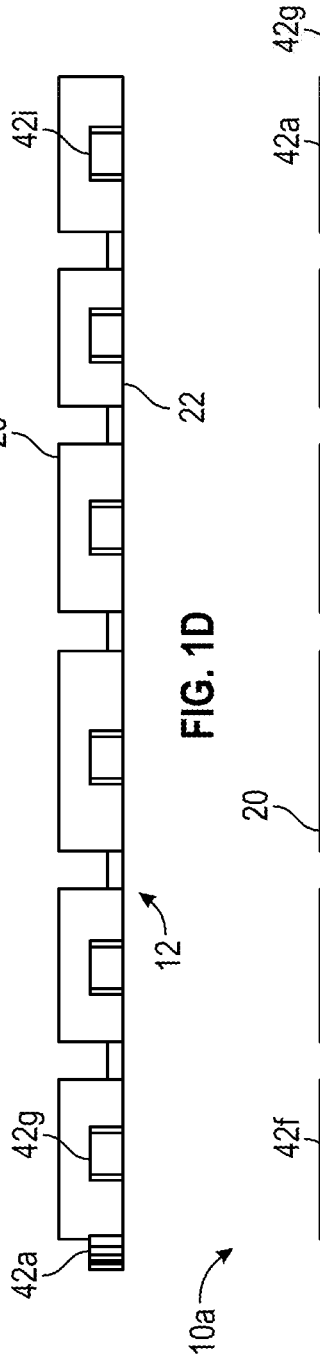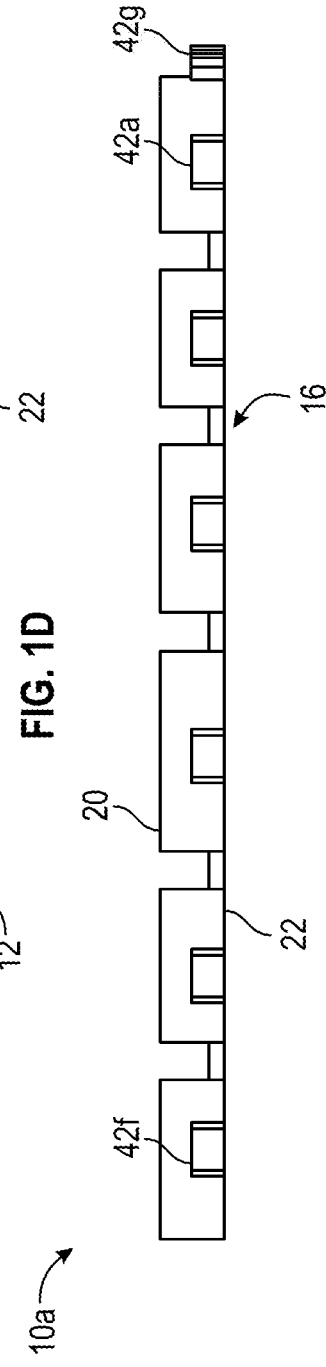

ONE PIECE WATER PERMEABLE PAVER

CROSS REFERENCE TO RELATED APPLICATIONS

The current application is continuation Patent Application based on a PCT Patent Application International Application No. PCT/US17/38557 filed on Jun. 21, 2017, which claims priority to a PCT application based on of U.S. Non-Provisional patent application Ser. No. 15/360,174, filed Nov. 23, 2016, now U.S. Pat. No. 9,670,624 issued on Jun. 6, 2017, which claims priority to and the benefit under 35 U.S.C. § 119(e) of U.S. Non-Provisional patent application Ser. No. 15/255,853, filed Sep. 2, 2016, now U.S. Pat. No. 9,617,698 issued on Apr. 11, 2017 which claims priority to and the benefit under 35 U.S.C. § 119(e) of now U.S. Provisional Patent Application Ser. No. 62/272,261, filed on Dec. 29, 2015. The disclosure of each application is hereby incorporated herein by reference in its entirety for all purposes.

FIELD

The present embodiments generally relate to a one piece water permeable paver forming a surface for traffic, such as a parking lot, a roadway, a golf cart path, a trail, a temporary roadway, a bicycle path, a jogging trail, a greenway space, a freight yard, a fire lane, a sidewalk, or another area where it is desirable for water to flow through rather than around a surface.

BACKGROUND

A need exists for a one piece water permeable paver that allows traffic and parking surfaces to be formed that enables grass to grow through the surface or contains aggregate, such as gravel, which allows water to permeate through the traffic and parking surface.

A need also exists for a one piece water permeable paver that can be a one piece molded unit created from recycled plastics, such as recycled milk bottles.

The present embodiments meet these needs.

BRIEF DESCRIPTION OF THE DRAWINGS

The detailed description will be better understood in conjunction with the accompanying drawings as follows:

FIG. 1B depicts a side view of a second side of the one piece water permeable paver according to one or more embodiments.

FIG. 1C depicts a side view of a fourth side of the one piece water permeable paver according to one or more embodiments.

FIG. 1D depicts a side view of a first side of the one piece water permeable paver according to one or more embodiments.

FIG. 1E depicts a side view of a third side of the one piece water permeable paver according to one or more embodiments.

Figure 1A:
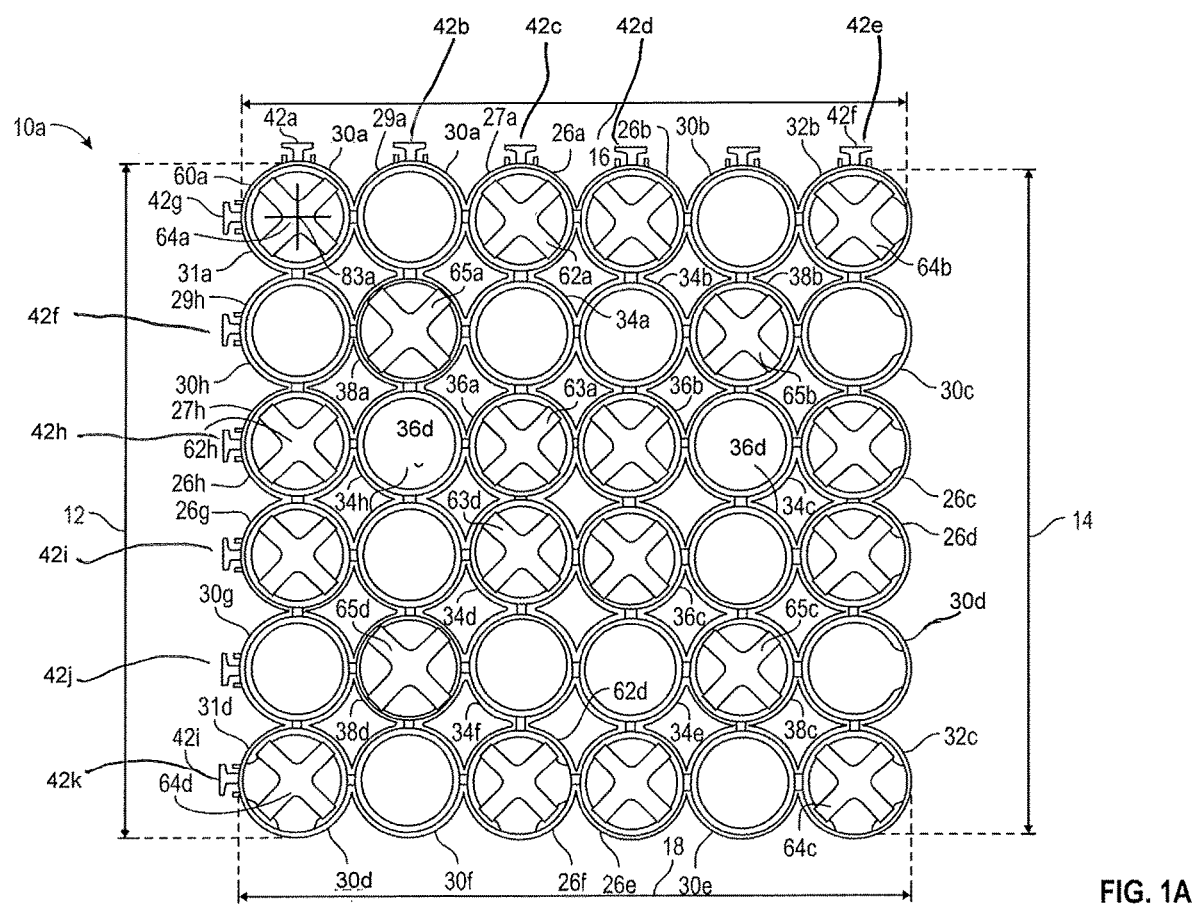
FIG. 1A depicts a top view of a one piece water permeable paver according to one or more embodiments.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The embodiments relate to a one piece water permeable paver for forming a surface suitable for traffic.

The one piece water permeable paver prevents flash flooding and thereby costly property damage and loss of life, by managing water flow and drainage in areas that otherwise present solid surfaces with little or no ability to absorb water.

The one piece water permeable paver helps improve the environment by enabling the removing of diesel, gasoline, oil and other pollutants from storm water through natural bioremediation before these pollutants enter a natural aquifer and poison shrinking water supplies which could lead to serious illness or death.

The one piece water permeable paver helps reduce rising temperatures from climate change and helps reduce environmental damage done to the planet due to the dramatic heating effects caused by the use of concrete and asphalt for traffic and parking surfaces.

The one piece water permeable paver improves the health of the planet by utilizing and recycling post-consumer and industrial waste that clog landfills. The one piece water permeable paver uses plastic trash, and recycles the plastic trash into a construction material usable to build parking lots, roadways, sidewalks and other traffic surfaces, including golf cart trails.

The one piece water permeable paver helps improve lifestyles for the handicapped or disabled persons as well as improve lifestyles for the elderly and children by enabling the construction of unobstructed and safe park trail ways. This one piece water permeable paver enables the construction of access ways to nature conservancies by providing inexpensive, natural grass and gravel ADA compliant walkways. The invention enables the construction of trails that are level and safe, preventing broken bones and other serious injuries and even death due to a fall.

The one piece water permeable paver prevents fire disasters by creating erosion resistant structures that include grass filled fire lanes so fire and emergency vehicles don't get stuck in the mud or prevented from reaching remote areas in a disaster as often happens in wildfire situations in California.

The one piece water permeable paver enables police and emergency responders to quickly install a roadway in a muddy area to quickly access a damaged area, where a permanent roadway was washed away.

The one piece water permeable paver provides roadways for occasional use by emergency vehicles and fire trucks in areas where the expense of a concrete roadway or asphalt roadway is prohibitive. The one piece water permeable paver enables the creation of inexpensive fire lanes, emergency lanes and maintenance vehicle lanes.

The embodiments relate to a one piece water permeable paver which can be interlocked together to create a system for soil stabilization. Soil stabilization can be achieved by connecting a plurality of one piece water permeable pavers together and filling the cells of the water permeable pavers with soil or aggregate.

The embodiments relate to a one piece water permeable paver for use with a storm water management system. Storm water management can be achieved by connecting together a plurality of one piece water permeable pavers and installing the connected one piece water permeable pavers adjacent a bayou or waterway.

The embodiments relate to a road formed from connected one piece water permeable pavers which have the cells are filled with aggregate.

The embodiments relate to a parking lot formed from connected one piece water permeable pavers with cells filled with dirt or grass or aggregate. In embodiments, the parking lot is an occasional use event parking lot or an industrial parking lot for staging of oil field drilling equipment.

For the purpose of this application the following definitions will be used herein.

The term "cell" as used herein can refer to the cylindrical molded shapes which are connected to either other cells or to a 24g to form the one piece water permeable paver. Cells can also be elliptical, rectangular, square or another polygon.

The term "inner flange" as used herein can refer to a sloped, triangular shaped structure when viewed in a side view that provides additional load support when each cell is filled with gravel, dirt, or aggregate. The inner flange specifically creates an increased surface area to prevent the one piece water permeable paver from being pushed into soil, keeping the paver level.

The term "parking marker" as used herein can refer to an insert, which can be plastic, and which provides a visual indicator creating parking zones or parking areas, and a plurality of the marking markers, used in a plurality of cells of the paver can create a parking series of dots, acting like a parking stripe. The plastic indicator can be non-deforming when driven over by a car.

Turning now to the Figures, FIG. 1A depicts a top view of a one piece water permeable paver according to one or more embodiments.

The one piece water permeable paver 10a can be made from a plurality of different types of cells connected to each other, to connectors 24a-24l, or to both.

The one piece water permeable paver can have a first side 12, a second side 14 opposite the first side 12, a third side 16 between the first side 12 and the second side 14, and a fourth side 18 between the first side 12 and the second side 14 opposite the third side 16.

The one piece water permeable paver 10a can have a plurality of outer flex joint connection cells 26a-26h. Each outer flex joint connection cell can engage a connector from the plurality of connectors 24a-24l.

Each outer flex joint connection cell can have an outer flex joint connection cell outer surface 27a-27h.

According to one or more embodiments, the one piece water permeable paver 10a can have a plurality of outer three connection cells 30a-30h.

Each outer three connection cell 30a-30h can be connected to one of the outer flex joint connection cells 26a-26h.

Each outer three connection cell can have an outer three connection cell outer surface 29a-29h respectively.

According to one or more embodiments, the one piece water permeable paver 10a can have a plurality of outer two connection cells 32a-32d.

Each outer two connection cell 32a-32d can connect to two adjacent outer three connection cells 30a-30h.

Each outer two connection cell can have an outer two connection cell outer surface 31a-31d.

According to one or more embodiments, the one piece water permeable paver 10a can have a plurality of inner single flex joint connection cells 34a-34h.

Each inner single flex joint connection cell 34a-34h can be connected to one of the connectors 24a-24l.

According to one or more embodiments, the one piece water permeable paver 10a can have a plurality of inner dual flex joint connection cells 36a-36d.

Each inner dual joint connection cell can engage two connectors simultaneously.

The one piece water permeable paver 10a can have a plurality of inner four connection cells 38a-38d.

Each of the inner four connection cells 38a-38d can connect to a pair of outer three connection cells 30a-30h and to a pair of inner single flex joint connection cells 34a-34h.

In embodiments, the one piece water permeable paver 10a can have an X-shaped anchor 62a-62h in each outer flex joint connection cell 26a-26h.

In embodiments, the one piece water permeable paver 10a can have an X-shaped anchor 63a-63d in each inner dual flex joint connection cells 36a-36d.

In embodiments, the one piece water permeable paver 10a can have X-shaped anchor 64a-64d in each of the outer two connection cells 32a-32d.

In embodiments, the one piece water permeable paver 10a can have an X-shaped anchor 65a-65d in each of the four connection inner cells 38a-38d.

Each cell can have a center point, such as outer two connection cell 32a having center point 83a.

In embodiments, the one piece water permeable paver can have the plurality of outer flex joint connection cells 26a-26h connecting adjacent cells at one of the clock positions: a 12 o'clock position, a 3 o'clock position, a 6 o'clock position and a 9 o'clock position.

In embodiments, the one piece water permeable paver can have the plurality of outer three connection cells 30a-30h connected to one adjacent outer flex joint connection cell 26a-26h, one adjacent outer two connection cell 32a-32d and one adjacent inner four connection cell 38a-38d at one of the clock positions: a 12 o'clock position, a 3 o'clock position, a 6 o'clock position and a 9 o'clock position.

In embodiments, the one piece water permeable paver can have the plurality of outer two connection cells 32a-32d connected to two adjacent outer three connection cells 30a-30h at one of the following clock positions on the outer surface of each cell: a 12 o'clock position, a 3 o'clock position, a 6 o'clock position and a 9 o'clock position.

In embodiments, the one piece water permeable paver can have the plurality of inner single flex joint connection cells 34l-34h connected to a connector 24a-24l at a clock position on the outer surface of each inner single flex joint connection cell that is at one of the clock positions: a 12 o'clock position, a 3 o'clock position, a 6 o'clock position or a 9 o'clock position.

In embodiments, the one piece water permeable paver can have the plurality of inner dual flex joint connection cells 36a-36d connected to a connector 24a-24l on the outer surface of each inner dual flex joint connection cell at one of the clock positions: a 12 o'clock position, a 3 o'clock position, a 6 o'clock position and a 9 o'clock position.

In embodiments, the one piece water permeable paver can have the inner four connection cells 38a-38d connected to adjacent cells at a clock position on the outer surface of each cell at one of the clock positions: a 12 o'clock position, a 3 o'clock position, a 6 o'clock position and a 9 o'clock position.

According to one or more embodiments, the one piece water permeable paver 10a can have a plurality of locking tabs 42a-42f extending from outer surfaces of cells forming the third side 16 of the one piece water permeable paver.

The one piece water permeable paver 10a can have a plurality of locking tabs 42g-42l extending from outer surfaces of cells forming the first side 12 of the one piece water permeable paver.

Each cell can have an inner flange 60a. Inner flange 60a is depicted on an outer two connection cell 32a.

Each inner flange can extend toward the center point 83 of each cell. Each inner flange can extend from the bottom of the one piece water permeable paver.

FIG. 1B depicts a side view of the second side 14 of the one piece water permeable paver 10a according to one or more embodiments.

According to one or more embodiments, the one piece water permeable paver 10a can have a plurality of fastening slots 40a-40f formed partially through the cell outer surface of the cells of the second side 14.

In embodiments, the plurality of fastening slots 40a-40f can cut from the bottom 22 of the one piece water permeable paver 10a partially through the outer surface towards the top 20.

FIG. 1C depicts a side view of the fourth side 18 of the one piece water permeable paver according to one or more embodiments.

The one piece water permeable paver 10a can have a plurality of fastening slots 40g-40l formed partially through the cell outer surface of cells that create the fourth side 18 of the one piece water permeable paver 10a.

In embodiments, the plurality of fastening slots 40g-40l can be cut from the bottom 22 partially through the outer surface towards the top 20.

FIG. 1D depicts a side view of the first side 12 of the one piece water permeable paver according to one or more embodiments.

The plurality of locking tabs 42g-42l can be formed on the outer surface of the outer cells extending from the bottom 22, opposite the top 20, of the one piece water permeable paver 10a. Locking tab 42a is also shown.

FIG. 1E depicts a side view of the third side 16 of the one piece water permeable paver according to one or more embodiments.

The one piece water permeable paver 10a can have a plurality of locking tabs 42a-42f extending from each outer surface of cells extending from the bottom 22, opposite the top 20, of the one piece water permeable paver 10a. Locking tab 42g is also shown.

The locking tabs of a first one piece water permeable paver can interlock with the fastening slots of an adjacent one piece water permeable paver to create a roadway, trail, or similar traffic surface.

FIGS. 1B through 1E depict the sides of the one piece water permeable paver.

Figure 2:
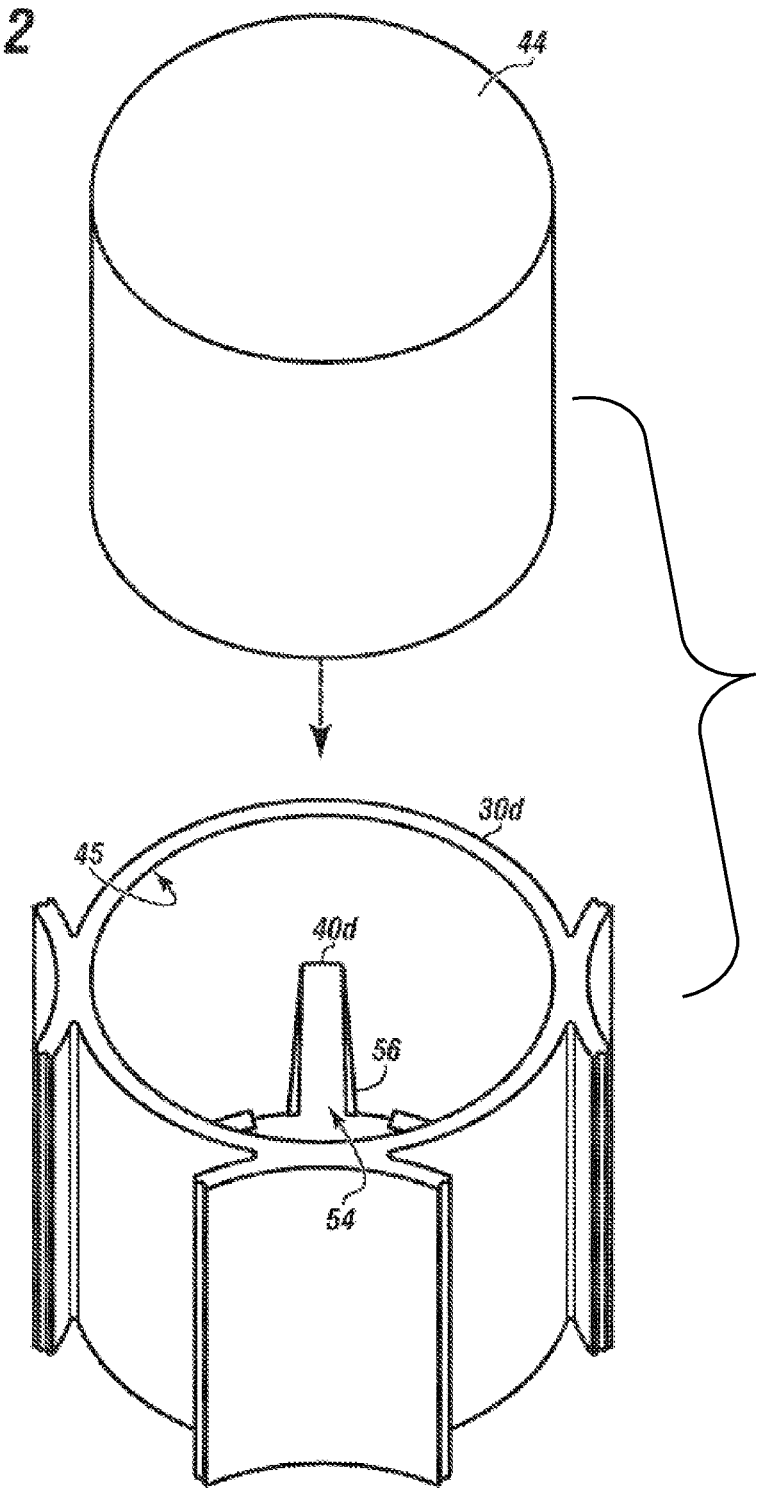
FIG. 2 depicts a detail of an inner surface of a cell 44, 36d of the one piece water permeable paver according to one or more embodiment with a parking marker.

FIG. 2 depicts a detail of an inner surface of a cell of the one piece water permeable paver according to one or more embodiment with a parking marker.

In embodiments, a parking marker 44 can be insertable into one of the cells to provide parking guidance to users, such as marking edges of parking spaces. This use of a parking marker enables a user to avoid the need for painting dirt, aggregate, or similar surface materials An inner surface 45 of an outer three connection cell 30d is shown with a fastening slot 40d.

The fastening slot 40d can be tapered from the bottom of the cell towards the top.

In embodiments, each fastening slot 40a-40l, shown here as 40d, can have an alignment opening 54 formed in the fastening slot for engaging a locking tab.

In embodiments, each fastening slot 40a-40l, shown here as 40d, can have a tensioning rib 56 adjacent the fastening slot. In embodiments, a tensioning rib can be positioned on both sides of the fastening slot.

Figure 3:
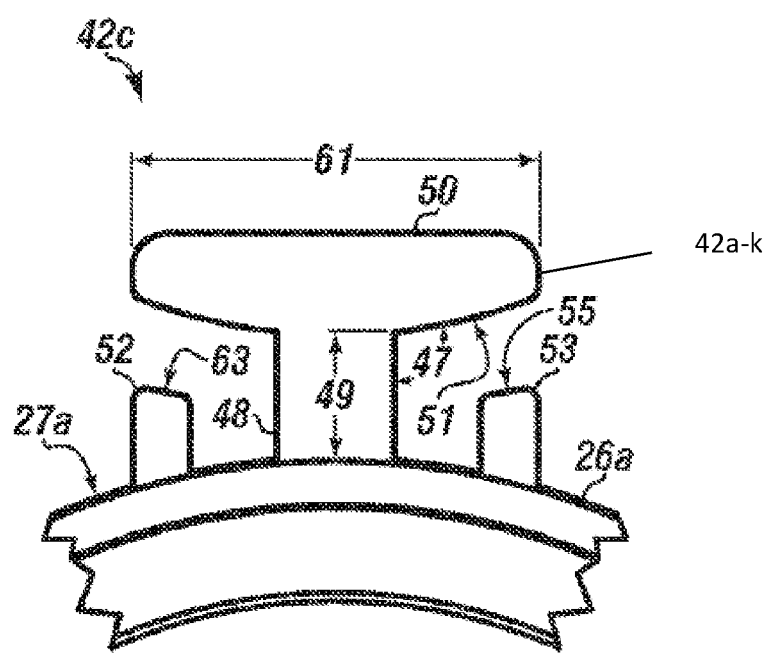
FIG. 3 depicts a detail of a locking tab 42a-k according to one or more embodiments.

FIG. 3 depicts a detail of a locking tab 42c according to one or more embodiments.

The locking tab 42c can have a shaft 48 with a shaft length 49 connected to the outer surface 27a of one of the outer flex joint connection cells 26a.

The locking tab 42c can have a head 50 connected to the shaft 48 at an angle 47. The angle 47 can be an angle from 80 degrees to 110 degrees from an axis of the shaft 48.

The locking tab 42c can have a head 50 with a head length 61. The head length 61 for the locking tabs can be larger than the shaft length 49.

The head 50 can have a load surface 51. The load surface 51 can have a slope that matches an inner surface curvature of a cell enabling the head to mate with a fastening slot.

A first sloped edge 52 can extend from the outer surface 27a of the outer flex joint connection cell 26a. The first sloped edge can be parallel with and spaced apart from the shaft 48 and also in a spaced apart relationship to the head 50.

An outer edge 63 of the first sloped edge 52 can have a curvature complimentary to the outer surface curvature of a cell with a fastening slot into which the head interlocks.

The outer length aspect of the first sloped edge 52 can have a width larger where the first sloped edge attaches to the outer surface 27a than the width at the outer edge 63. The first sloped edge can be tapered in embodiments.

A second sloped edge 53 can extend from the outer surface 27a of the outer flex joint connection cell 26a.

The second sloped edge 53 can be parallel with and spaced apart from the shaft 48 and can also be in a spaced apart relationship to the head 50.

The second sloped edge 53 can be opposite the first sloped edge 52.

An outer edge 55 of the second sloped edge 53 can have a curvature complimentary to the outer surface curvature of a cell with a fastening slot into which the head interlocks.

The outer length aspect of the second sloped edge 53 can have a width larger where the second sloped edge attaches to the outer surface 27a than the width at the outer edge 55. The second sloped edge can be tapered in embodiments.

Figure 4A:
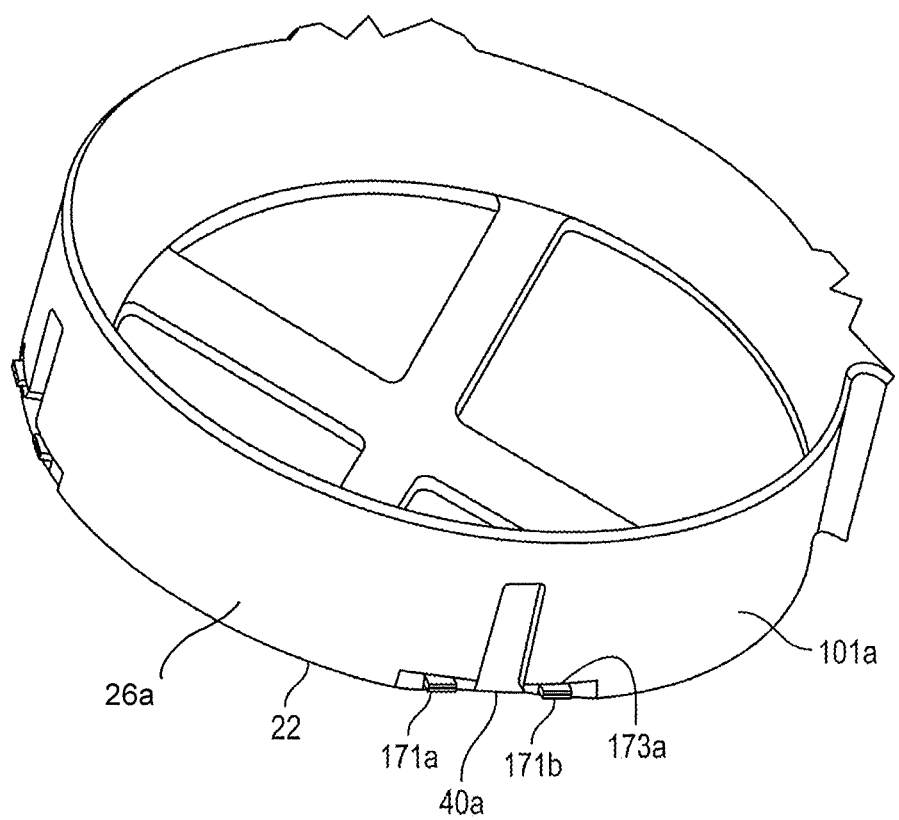
FIG. 4A depicts the bottom and top of the once permeable paver feature element 266 according to one or more embodiments.

FIG. 4A depict the bottom and top of the one piece perm

In embodiments the one piece water permeable paver 10a has a fastening slot 40a.

In proximity to the fastening slot 40a can be one or more bottom snap locking portion 171a and 171b. The bottom snap locking portion 171a and 171b may be proximate to a bottom of the once piece permeable paver 10a.

In embodiments, the one piece water permeable paver 10a has a locking tab 42a. In proximity to the locking tab 42a can be one or more top snap locking portion 172a and 172b. The top snap locking portion 172a and 172b may be proximate to a bottom 22 of the one piece permeable paver.

The bottom snap locking portion 171a and 171b can include a bottom snap locking planar surface, such as bottom snap locking planar surface 173a. Similarly, top snap locking portion 172a and 172b can include a top snap locking planar surface, such as top snap locking planar surface 174a.

Figure 4B:
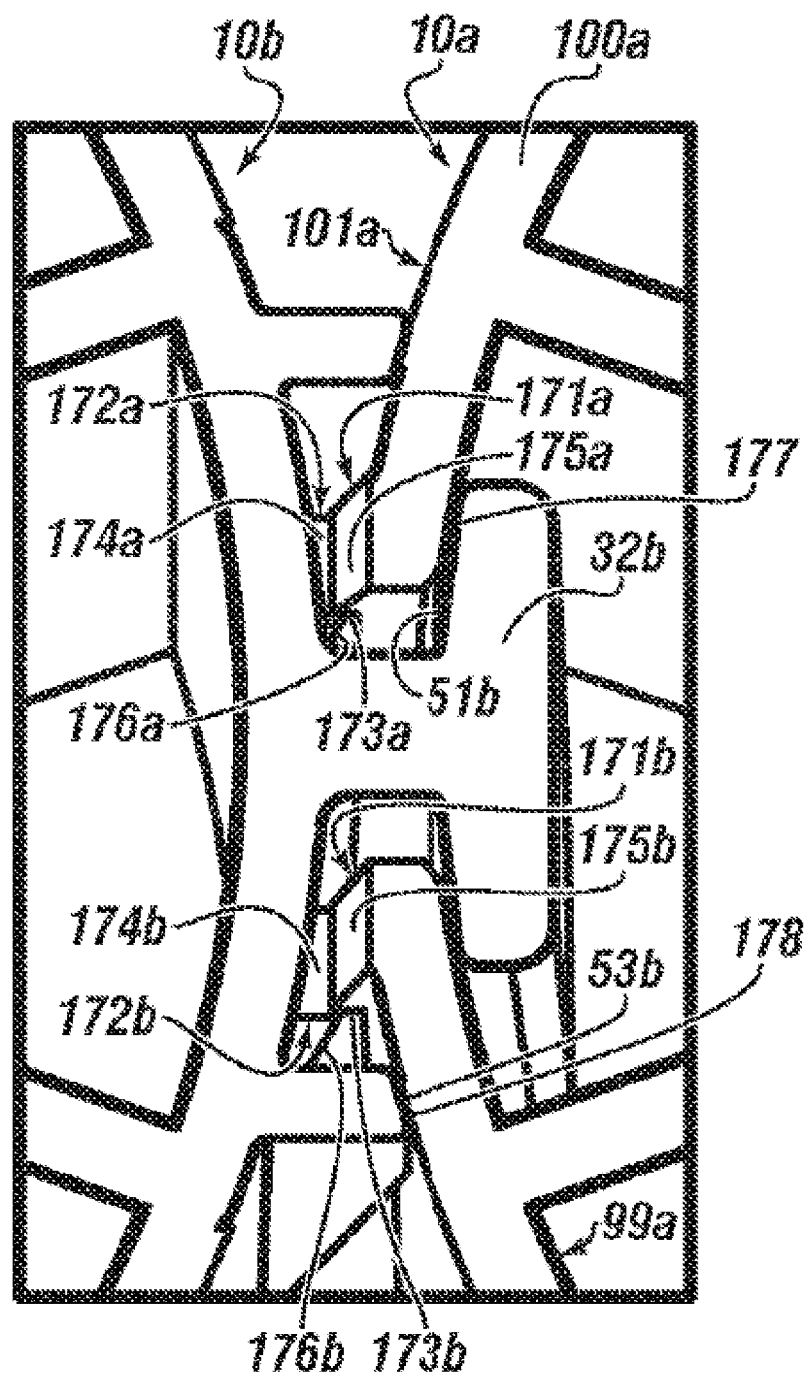
FIG. 4B depicts a cut-away view of a first one piece permeable cell 10b with a locking tab 32b in connection with a second locking portion 40a of a cell 10a in FIG. 4A.

FIG. 4B depicts cut view of a first one piece water permeable in connection with a second one piece water permeable paver.

As the pavers 10a and 10b are connected together, bottom snap locking portion 171a and 171b and top snap locking portion 172a and 172b may be movingly engaged with respective snap locking tapered surfaces 175 and 176, as would be apparent to one of skill in the art. Once the one piece water permeable pavers 10a and 10b are connected together, the bottom and top snap locking planar surfaces 173a and 174b may be engaged. The use of the bottom and top snap locking planar surfaces 173a and 174b can provide additional load support and distribution with connected pavers 10a and 10b.

The locking tab 42b can include a rounded inner load surface 51b. The rounded inner load surface 51b can be configured to smoothly engage a corresponding rounded inner surface 99a of first paver outer wall 100a, such as at contact point 177.

The load surface 51b can have a slope that matches an outer wall 100a surface curvature for its inner surface 99a, which can enable locking tab 42b to mate with the corresponding surface 99a proximate to the fastening slot 40a.

An outer sloped edge 53b can have a curvature complimentary to the outer wall 100a curvature for outer wall surface 101a, which can enable to the pavers 10a and 10b to come into contact at contact point 178.

In embodiments, the one piece water permeable paver can be made from recycled plastics, such as milk bottles.

In embodiments, the one piece water permeable paver can be pigmented with soy based pigments to be environmentally friendly.

Installing the one piece water permeable pavers can be a simple six step process.

The process can include clearing and grading a ground surface, as the first step. This clearing and grading can be done by hand with a shovel for a small area or with a bulldozer for a large area.

The process can include laying and spreading ½ an inch to 8 inches of ½ inch to 1 and ½ inch diameter rock or gravel onto the cleared and graded ground, as the second step. This layer of rock or gravel can be compacted or compressed with a roller or compactor.

The process can include preassembling the one piece water permeable pavers into four interconnected pavers with the locking tabs interlocking into the slots, as the third step.

The process can include placing the preassembled one piece water permeable pavers over the compacted or compressed rock or gravel, as the fourth step.

The process can include dumping the aggregate into the cells of the one piece water permeable pavers, as the fifth step. From ¾ inch to 1 and ½ inch rock, recycled asphalt, or other aggregate can be used to evenly fill the cells.

The process can also include compacting the filled cells, forming a parking lot or traffic surface ready to use for 25 plus years without maintenance, as the sixth step.

A process to create a stabilized water permeable grass parking or traffic surface can include performing steps one, two, three and four as described above. After laying the pavers, the process can include filling the cells of the one piece water permeable pavers with soil instead of aggregate and installing seed or sod as desired.

Foot paths can also be created with the one piece water permeable pavers. Any size path can be made with the one piece water permeable pavers.

While these embodiments have been described with emphasis on the embodiments, it should be understood that within the scope of the appended claims, the embodiments might be practiced other than as specifically described herein.

What is claimed is:

1. A one piece water permeable paver construction for forming a surface suitable for supporting traffic, said construction comprising a top paver portion and a bottom paver portion;

said top paver portion including a plurality of connectors and a plurality of cells including:
  a. a plurality of outer flex joint connection cells, each outer flex joint connection cell connecting to one of a plurality of connectors, each outer flex joint connection cell having an outer flex joint connection cell outer surface;
  b. a plurality of outer three connection cells, each outer three connection cell connecting to one of the outer flex joint connection cells, each outer three connection cell having an outer three connection cell outer surface;
  c. a plurality of outer two connection cells, each outer two connection cell connected to two of the outer three connection cells, each outer two connection cell having an outer two connection cell outer surface;
  d. a plurality of inner single flex joint connection cells, each inner single flex joint connection cell connected to one of the connectors;
  e. a plurality of inner dual flex joint connection cells, each inner dual flex joint connection cell engaging two connectors simultaneously;
  f. a plurality of inner four connection cells, each said inner four connection cell connecting to a pair of outer three connection cells and a pair of inner single flex joint connection cells; with the connected cells forming the top paver portion having a first side, a second side opposite the first side, a third side between the first side and the second side, and a fourth side between the first side and the second side opposite the third side, and also forming a top and a bottom;
  g. a plurality of top locking tabs extending from outer surfaces of outer cells of the plurality of cells that form the first side and the third side; and said bottom paver portion including a plurality of bottom snap locking portions, said bottom snap locking portions and said top locking tabs are movingly engageable to form a top snap locking panel surface and a bottom snap locking planar surface.

2. The construction of claim 1, comprising a parking marker insertable in one of the cells.

3. The construction of claim 1, wherein the plurality of outer flex joint connection cells connect on an outer surface of each outer flex joint connection cell at clock positions on an outer surface consisting of: a 12 o'clock position, a 3 o'clock position, a 6 o'clock position and a 9 o'clock position.

4. The construction of claim 1, wherein the plurality of outer three connection cells are connected to one of the outer flex joint connection cells, one of the outer two connection cells and one inner four connection cell at clock positions on an outer surface of the outer three connection cells consisting of: a 12 o'clock position, a 3 o'clock position, a 6 o'clock position and a 9 o'clock position.

5. The construction of claim 1, wherein the plurality of outer two connection cells connect to two outer three connection cells at clock positions on an outer surface of the outer two connection cells consisting of: a 12 o'clock position, a 3 o'clock position, a 6 o'clock position and a 9 o'clock position.

6. The construction of claim 1, wherein the plurality of inner single flex joint connection cells are connected to one of the connectors at a clock position on an outer surface of the inner single flex joint connection cell consisting of a 12 o'clock position, a 3 o'clock position, a 6 o'clock position and a 9 o'clock position.

7. The construction of claim 1, wherein the plurality of inner dual flex joint connection cells connect to one of the connectors at a clock position on an outer surface of each inner dual flex joint connection cell consisting of: a 12 o'clock position, a 3 o'clock position, a 6 o'clock position and a 9 o'clock position.

8. The construction of claim 1, wherein the inner four connection cells connect to adjacent cells at a clock position on an outer surface of each four connection inner cell consisting of: a 12 o'clock position, a 3 o'clock position, a 6 o'clock position and a 9 o'clock position.

9. The construction of claim 1, wherein the plurality of locking tabs are formed on an outer surface of the outer cells and extend from the bottom of the one piece water permeable paver.

10. The construction of claim 1, wherein further including a plurality of fastening slots, said plurality of fastening slots are cut from the bottom of the one piece water permeable paver construction partially through an outer surface of the construction towards the top.

11. The construction of claim 1, wherein each locking tab of the plurality of locking tabs comprises:
   a. a shaft with a shaft length connected to the outer surface of an outer cell on the first side and the third side of the one piece water permeable paver construction;
   b. a head connected to the shaft at an angle with a slope from 80 degrees to 110 degrees from the shaft, the head having a load surface that mates with an inner surface curvature of an outer cell;
   c. a first sloped edge extending from the outer surface, the first sloped edge extending parallel with and spaced apart from the shaft and also in a spaced apart relationship to the head; and
   d. a second sloped edge extending from the outer surface, the second sloped edge extending parallel with and spaced apart from the shaft and also in a spaced apart relationship to the head and opposite the first sloped edge.

12. The construction of claim 10, wherein at least one of the fastening slots is tapered from the bottom of the one piece water permeable paver construction narrowing towards the top.

13. The construction of claim 10, wherein at least one of the fastening slots has an alignment opening formed in the at least one fastening slot for engaging the locking tab.

14. The construction of claim 10, comprising at least one tensioning rib adjacent one of the fastening slots, wherein at least one the tensioning rib is formed on an inner side of a cell.

15. The construction of claim 1, wherein each connector has a first arm connected to a body and a second arm connected to the body, wherein each arm engages a different cell.

16. The construction of claim 1, wherein each cell has an inner flange mounted to an inner surface of each cell, the inner flange extending toward a center point of each cell, and the inner flange mounted to extend from the bottom of the one piece water permeable paver construction.

17. The construction of claim 1, comprising at least one of: an X-shaped anchor connected to an inner surface of outer flex joint connection cells, and an X-shaped anchor connected to an inner surface of inner dual flex joint connection cells, an X-shaped anchor connected to an inner surface of outer two connection cells, and an X-shaped anchor connected to an inner surface of four connection inner cells.

18. The construction of claim 15, wherein a body of the connector is twice as long as either the first arm or the second arm.

19. The construction of claim 18, wherein the body is U-shaped.

20. The construction of claim 1, comprising a light module in at least one of the outer cells, inner cells of the plurality of cells, and combinations thereof.

* * * * *

UNITED STATES PATENT AND TRADEMARK OFFICE
CERTIFICATE OF CORRECTION

PATENT NO. : 10,954,639 B2
APPLICATION NO. : 16/290011
DATED : March 23, 2021
INVENTOR(S) : Stiles It is certified that error appears in the above-identified patent and that said Letters Patent is hereby corrected as shown below:

On the Title Page

Column 1, (63), Lines 1-2:
Delete "Continuation of application No. 15/255,853, filed on Sep. 2, 2016, now Pat. No. 9,617,698."
and insert --Continuation of international application No. PCT/US17/38557, filed on Jun. 21, 2017.--

Signed and Sealed this
Seventeenth Day of May, 2022

*Katherine Kelly Vidal*

Katherine Kelly Vidal
*Director of the United States Patent and Trademark Office*